UNITED STATES PATENT OFFICE.

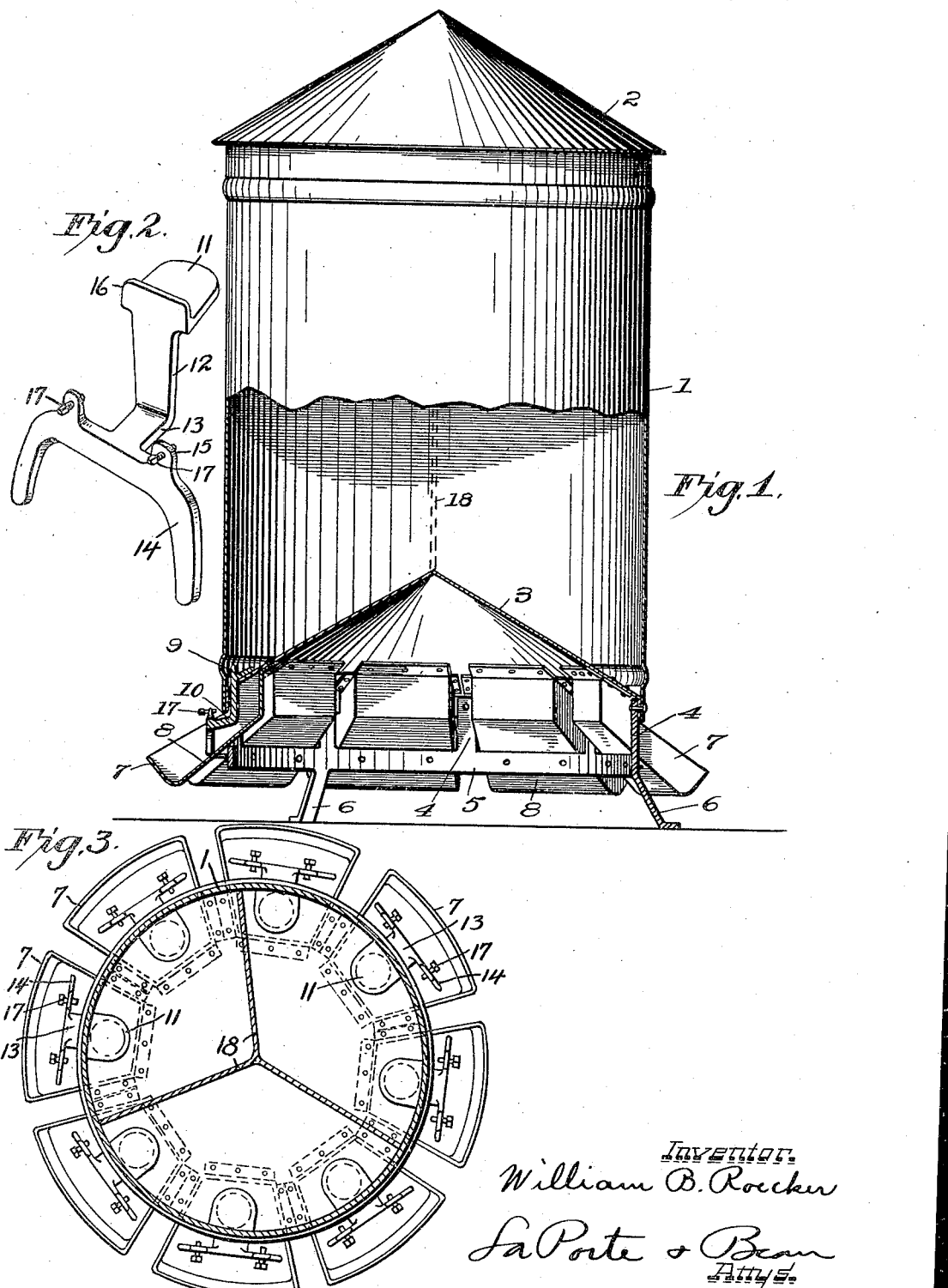

WILLIAM B. ROECKER, OF MORTON, ILLINOIS, ASSIGNOR TO THE MEYER CORPORATION, OF MORTON, ILLINOIS, A CORPORATION OF ILLINOIS.

ANIMAL-FEEDER.

1,316,852.   Specification of Letters Patent.   Patented Sept. 23, 1919.

Application filed August 18, 1915. Serial No. 46,052.

*To all whom it may concern:*

Be it known that I, WILLIAM B. ROECKER, a citizen of Germany, a resident of Morton, in the county of Tazewell and State of Illinois, have invented new and useful Improvements in Animal-Feeders, of which the following is a specification.

My invention relates to improvements in animal feeders, the pricipal object being the provision of such a device wherein the supply of feed to the trough is controlled by the animal.

A further object is the provision of a device of this nature having a plurality of separate troughs with means for controlling the discharge of feed thereinto, actuated by the animal.

Another object is the provision of an animal feeder which is simple and strong in construction and efficient in operation.

To the accomplishment of the foregoing and such other objects as may hereinafter appear, my invention consists in the combination, construction and arrangement of parts hereinafter described, and then sought to be defined in the appended claims, reference being had to the accompanying drawings forming a part hereof, and which shows merely for the purpose of illustrative disclosure, a preferred embodiment of my invention, it being understood that various changes may be made in practice within the scope of the claims, without digressing from my inventive idea.

In the figures,

Figure 1 represents an elevational view of a device constructed according to my invention, the lower portion being shown in vertical section;

Fig. 2 is a perspective view of one of the actuating members for controlling the supply of feed to the trough;

Fig. 3 is a transverse section through the receptacle showing the plurality of compartments.

Referring now to the drawings, the numeral 1 designates the body of the device which is in the form of a cylindrical compartment or receptacle having the top 2 and the conical bottom 3. It is supported on the extensions or struts 4 of the supporting ring 5 which has the legs 6.

Mounted around the bottom of this receptacle are the troughs 7 which are spaced apart or individual, as shown. They are positioned between the ring 5 and the bottom edge of the casing 1 and each has the inclined bottom 8, being secured to the conical bottom 3 of the receptacle or compartment 1, so that the openings 9, which are formed one for each trough in said conical bottom 3, will discharge into said troughs.

Positioned in each trough is an actuating member 10 having the flat extension 11 which forms a valve, covering opening 9 in the conical bottom 3. Each actuating member 10 has the depending shank 12 with the angle extension 13 connected to the yoke or forked portion 14, providing the pair of spaced legs or supports which rest on the bottom of the trough. On top of this forked portion, I provide the stops 15 which are adapted to engage the edge of the body when the member is pushed to the limit of its inward movement. I also provide the flange 16 along the edge of the flat extension 11, the purpose of which will be described presently.

Assuming that the receptacle contains feed and that the actuating member is in its normal position, that shown to the left in Fig. 1, the operation is as follows. The animal engages the forked portion 14 of the member 10 and pushes, thereby moving the valve 11 so as to uncover the opening 9 and permit the feed to discharge into the trough. This continues until the animal stops the pressure against the actuating member, when due to its weight and the pressure of the feed against it and against the flange 16, the actuating member returns to its lower position closing the opening 9 and stopping the supply of feed. The stops 15 and shank 12 suitably limit the movement of the actuating member.

I also provide means for adjusting the amount of movement of the actuating member 10 so that the amount of opening made each time may be varied, according to the matter in the receptacle and according to other conditions, this means taking the form of set screws 17 secured in the stops 15, which may be adjusted so as to bear against the lower edge of the cylindrical compartment or receptacle 1.

It is also possible to feed different kinds of materials with this device, and for this purpose, I divide the receptacle 1 into a plurality of different compartments by means of the partition 18, so that an animal may be provided with a slight variety of diet.

It is evident, therefore, that I have provided a simple and effective means of feeding animals without waste and without attention, the animals controlling the supply of feed, as desired. A plurality of troughs are provided, the number of which may be varied according to conditions, so that each animal may feed from one trough without interference and control its own supply of feed.

What I claim is:—

1. An animal feeder including in combination, a receptacle having a sloping bottom, having a plurality of spaced openings, a plurality of troughs secured around the bottom of said receptacle, and an actuating member for each trough having a portion serving as a valve for one of said openings whereby the supply of feed from the receptacle to each trough may be controlled by animals, said actuating member having a forked portion resting on the bottom of its trough and being adapted to return to its normal position by gravity.

2. An animal feeder including a receptacle provided with a plurality of openings, a plurality of troughs arranged about the bottom of said receptacle with which said openings communicate, an actuating member for each trough having a forked portion adapted to be pushed by the animal, a shank portion and a flat extension serving as a valve to cover one of said openings, said actuating member covering said opening in its normal position and uncovering it when moved by the animal, and a flange on said flat extension against which the feed bears to assist in the return of the actuating member to its normal position.

3. An animal feeder, including in combination, a cylindrical receptacle, a supporting ring member having legs and a plurality of extensions secured to the bottom portion of the receptacle, a plurality of troughs mounted on said ring member and having portions extending beneath the bottom of said receptacle, said receptacle having a plurality of openings, one for each trough, and means for each trough operated by the animal feeding therein for controlling the passage of material from the receptacle to the troughs.

WILLIAM B. ROECKER.

Copies of this patent may be obtained for five cents each, by addressing the "Commissioner of Patents, Washington, D. C."